(12) United States Patent
Möllmer et al.

(10) Patent No.: US 7,975,394 B2
(45) Date of Patent: Jul. 12, 2011

(54) TILT SENSOR

(75) Inventors: Frank Möllmer, Matting b. Pentling (DE); Frank Singer, Regenstauf (DE); Michael Schumann, Neu-Ulm (DE); Martin Haushalter, Regensburg (DE); Thomas Hoefer, Lappersdorf (DE); Christine Rüth, Regensburg (DE); Stefan Strüwing, Regensburg (DE)

(73) Assignee: Osram Opto Semiconductors GmbH, Regensburg (DE)

( * ) Notice: Subject to any disclaimer, the term of this patent is extended or adjusted under 35 U.S.C. 154(b) by 13 days.

(21) Appl. No.: 12/295,794

(22) PCT Filed: Apr. 10, 2007

(86) PCT No.: PCT/DE2007/000630
§ 371 (c)(1),
(2), (4) Date: Aug. 14, 2009

(87) PCT Pub. No.: WO2007/115560
PCT Pub. Date: Oct. 18, 2007

(65) Prior Publication Data
US 2010/0000104 A1  Jan. 7, 2010

(30) Foreign Application Priority Data
Apr. 7, 2006  (DE) .......................... 10 2006 016 523

(51) Int. Cl.
*G01C 9/06* (2006.01)
(52) U.S. Cl. ................................. 33/366.23; 33/366.11
(58) Field of Classification Search ............... 33/366.11, 33/366.23
See application file for complete search history.

(56) References Cited

U.S. PATENT DOCUMENTS

| | | | |
|---|---|---|---|
| 4,696,277 A | 9/1987 | Katayama | |
| 4,972,595 A * | 11/1990 | Shimamura et al. | 33/366.23 |
| 5,373,153 A * | 12/1994 | Cumberledge et al. | 33/366.23 |
| 6,664,534 B2 * | 12/2003 | Hjertman et al. | 33/366.11 |
| 6,708,416 B1 * | 3/2004 | Havens et al. | 33/366.23 |
| 7,161,138 B2 * | 1/2007 | Hsu | 250/231.1 |
| 2003/0057361 A1 | 3/2003 | Chou | |
| 2006/0151685 A1 | 7/2006 | Hsu | |
| 2007/0180718 A1 * | 8/2007 | Fourquin et al. | 33/366.11 |
| 2007/0277386 A1 * | 12/2007 | Bozzone et al. | 33/391 |
| 2010/0101103 A1 * | 4/2010 | Horio et al. | 33/366.23 |

FOREIGN PATENT DOCUMENTS

| | | |
|---|---|---|
| DE | 42 10 214 | 9/1993 |
| DE | 42 38 930 | 5/1994 |
| DE | 102 61 961 | 10/2003 |
| DE | 10 2004 008 636 | 9/2005 |

(Continued)

OTHER PUBLICATIONS

"English Translation of Notification for the Opinion of Examination", Application No. 96111624, mailed on Nov. 1, 2010 (6 pages).

*Primary Examiner* — G. Bradley Bennett
(74) *Attorney, Agent, or Firm* — Fish & Richardson P.C.

(57) ABSTRACT

The invention is directed to a tilt sensor comprising at least one body movable along a predefined path and an optoelectronic unit for determining the position of said body, said tilt sensor being surface-mountable. The invention is further directed to a tilt sensor assembly.

41 Claims, 6 Drawing Sheets

FOREIGN PATENT DOCUMENTS

| | | |
|---|---|---|
| EP | 0 900 357 | 1/2006 |
| JP | 6-74766 | 3/1994 |
| JP | 11-351845 | 12/1999 |
| JP | 11-351863 | 12/1999 |
| TW | 262296 | 9/2006 |
| WO | WO 97/44636 | 11/1997 |
| WO | WO 03/081175 | 10/2003 |
| WO | WO 2004/020943 | 3/2004 |

\* cited by examiner

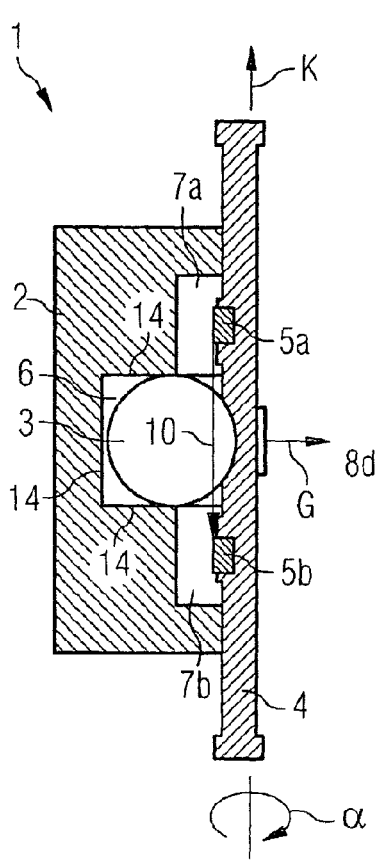
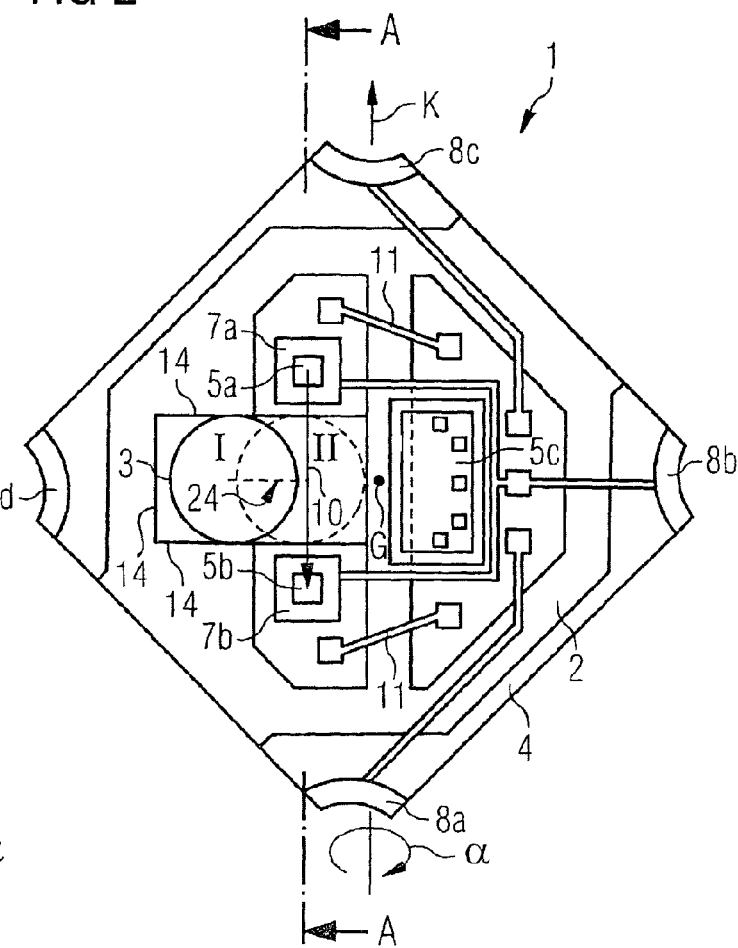

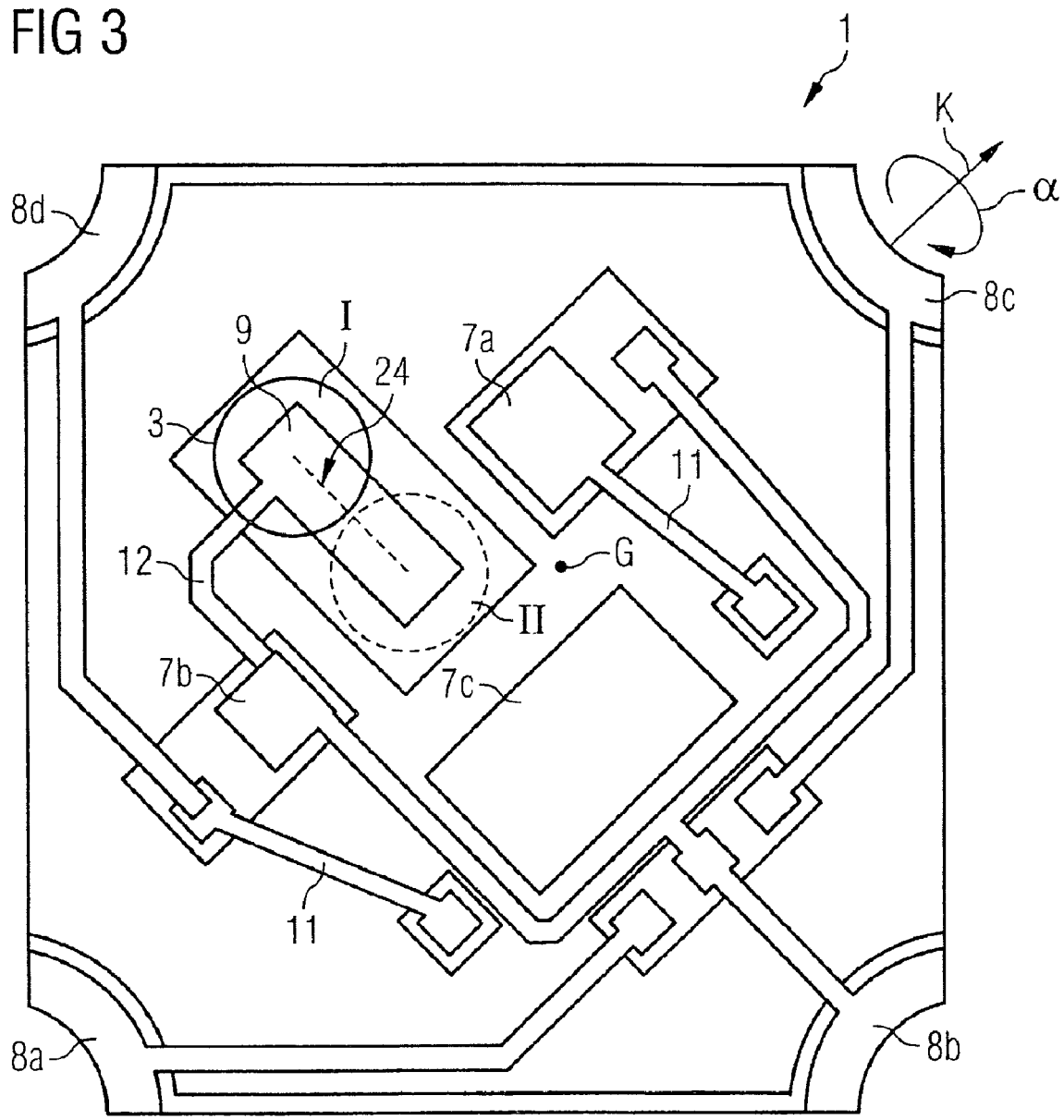

TILT SENSOR

CROSS-REFERENCE TO RELATED APPLICATION

This application is the National Stage of International Application No. PCT/DE2007/000630, filed Apr. 10, 2007, which claims priority to German Patent Application No. 102006016523.3, filed Apr. 7, 2006, whose disclosure content is hereby incorporated by reference.

TECHNICAL FIELD

The invention is directed to a tilt sensor and a tilt sensor assembly.

BACKGROUND

Unexamined patent application US 2003/0057361 describes a tilt sensor comprising a ball and an optoelectronic sensor with light-emitting and light-receiving units. The sensor and the ball are disposed in an insulating housing.

Known from the abstract JP 11351845 A is a tilt sensor having a housing in which are disposed a metal ball, a light-emitting element and a plurality of light-receiving elements associated with said light-emitting element. The housing is configured as polygonal to permit detection in four measurement directions.

Unexamined patent application DE 102 61 961 A1 describes an inclination sensor having a track made from an injection-molded polymeric plastic and an element movable along said track. The position of the movable element along the track can be determined either capacitively or galvanically, by means of an electrode structure.

Known from unexamined patent application WO 2004/020943 is a tilt sensor comprising a body, a cavity in said body, and an element positionable in said cavity. When the body is rotated about an axis, the element is able to move under the influence of gravity between at least two positions in the cavity. The tilt sensor further comprises a detector, inside the body, that detects when the element is in one of the two positions. The body is made of layers stacked one on top of the other.

SUMMARY

One object of this disclosure is to specify a tilt sensor that is of compact construction.

A further object of this disclosure is to specify a tilt sensor assembly that permits better attitude determination than is possible with a single tilt sensor.

Advantageous improvements of the tilt sensor and of the tilt sensor assembly are specified in the dependent claims.

A tilt sensor in one embodiment is surface-mountable and includes at least one body that is movable on a predefined surface along a predefined path and, further, an optoelectronic unit for determining the position of said body.

A predefined path is to be understood herein not as a physical component of any kind, but as the projection onto the predefined surface, in the direction of a surface normal, of a trajectory along which a center of mass of the body moves. The predefined surface counteracts the gravitational force of the body. The path is predefined by a guidance of the body, i.e., the movement of the body is subject to imposed conditions.

The optoelectronic unit in question includes at least one radiation-emitting element and at least one radiation-receiving detector unit. The optoelectronic unit preferably also includes a circuit unit.

A surface-mountable tilt sensor can also be called an SMD (Surface Mounted Device) tilt sensor. This is to be understood as encompassing a tilt sensor that can be electrically connected wirelessly to a circuit board or to another substrate. This type of arrangement permits simple electrical contacting and, at the same time, simple attachment of the tilt sensor.

According to a preferred variant, the tilt sensor's able to rotate about a tilt axis in such a way that the body moves from a first position to a second position. The rotation of the tilt sensor can thus be translated into a movement of the movable body, and the change in the position of the body can be determined by means of the optoelectronic unit. When the tilt sensor is used in a device, a change in the position of the device can advantageously be indicated in this way. In such a case, the first position can correspond to a vertical orientation of a longitudinal axis of the device and the second position to a horizontal orientation of a longitudinal axis of the device.

According to a particularly preferred variant, the beam path of a photoelectric barrier formed by means of the radiation-emitting unit and the radiation-receiving detector unit is closed when the body is in the first position.

The beam path produced by the radiation-emitting unit and the radiation-receiving detector unit is preferably interrupted when the body is in the second position. The body is substantially impenetrable to radiation emitted by the radiation-emitting unit and detected by the detector unit.

It is understood that the invention is not limited to this arrangement. Rather, the beam path can also be interrupted when the body is in the first position and can accordingly be closed when the body is in the second position.

Advantageously, one optoelectronic unit can, suffice to determine two different positions of the body.

It can further be provided that the body is in the second position after a rotation of the tilt sensor by a tilt angle $\alpha=90°$. In this case, a rotation by $\alpha=90°$ is determined by means of the tilt sensor. When the tilt sensor is used in a mobile device, particularly a camera, it is advantageously possible to distinguish between portrait mode and landscape mode in this way. Portrait mode can correspond to a vertical orientation of the longitudinal axis of the device and landscape mode to a horizontal orientation of the longitudinal axis of the device.

According to a preferred embodiment, the force of gravity causes a movement of the body along the predefined path. For example, the body can move from the first position to the second position when the tilt sensor is rotated in the field of gravity. The inventive tilt sensor thus is based on an advantageously simple operating principle.

According to a further preferred embodiment, the tilt sensor comprises a housing body. The body can be disposed in a recess in the housing body. Said recess is preferably configured as channel-like. This has, in particular, the advantage that guidance of the body is possible by means of the recess. The path of the body can thus be predefined by the shape of the recess.

In a further implementation, the housing body comprises at least one projection or indentation inside the recess.

Said projection or indentation is disposed particularly on an inner surface of the housing body that bounds the recess. This presents no obstacle to the movement of the body, since the projection or indentation extends, for example, along the body's direction of movement.

The projection or indentation is particularly preferably configured such that a contact surface between the body and the inner surface is reduced. Static friction can advantageously be reduced in this way, so that the body can be set in motion relatively unhinderedly when a rotation occurs.

The projection can, for example, extend in a roof shape on the inner surface. The indentation can be configured in particular as gutter-shaped. The projection or indentation preferably has a bent or curved outer surface. The shape of said outer surface in cross section can, for example, resemble a triangle or a semicircle.

The projection or indentation is particularly preferably part of the housing body and is configured in one piece therewith.

In a preferred implementation, the housing body contains an electrically conductive material. This advantageously can prevent electrostatic discharges. Charge-induced attractive forces between the housing body and the body, which might have an adverse effect on a movement of the body, can be reduced in this way. The material provided for the housing body is preferably admixed with the electrically conductive material. A suitable material for the housing body is, for example, an electrically conductive synthetic material.

The housing body particularly contains carbon fibers or carbon black particles to improve electrical conductivity. The housing body can simultaneously be blackened in this way, and stray light effects that might interfere with a detector signal are effectively reduced. To achieve the latter effect, it is further advantageous to provide a low-reflecting material for the housing body. As an additional measure, the inner surface of the housing body can be roughened.

The electrically conductive material can be embedded in a base material of high rigidity and heat resistance. For example, LCP (Liquid Crystal Polymer) or PPA (Polyphthalamide) can be used as the base material for the housing body.

In a further embodiment, the tilt sensor comprises a circuit board that is connected to the housing body. The circuit board can also be provided with a coating to reduce stray light effects. The coating can be a black solder resist, for example.

According to an advantageous improvement, the circuit board serves as the bottom panel of the tilt sensor. This dual function helps to give the tilt sensor a compact construction. A further reduction in component size can be obtained by means of vias which are disposed at corners of the circuit board and which can in particular be configured as quarter-circle-shaped. The dimensions of the tilt sensor preferably assume values in the single-digit millimeter range. Particularly preferably, said dimensions assume values between 4 mm×4 mm×1 mm and 5 mm×5 mm×3 mm. For example, the tilt sensor can have dimensions of 4 mm×4 mm×1.7 mm.

Particularly advantageously, the vias connect top-side connection surfaces to back-side solder contacts. The back-side solder contacts serve to electrically connect the tilt sensor and, in particular, to surface-mount it.

The housing body is preferably connected form-lockingly to the bottom panel. Particularly preferably, the housing body rests on the circuit board in such a way that the recess in which the body is disposed is bounded on at least one side by the circuit board.

Further preferably, the optoelectronic unit is disposed on the circuit board. The optoelectronic unit can advantageously be mounted on the circuit board, for example glued to it, before the housing body is placed over the optoelectronic unit. Simple mounting of the optoelectronic unit is possible in this way.

In addition to the recess for the body, the housing body can also comprise another recess, in which the optoelectronic unit is disposed. The housing body protects the optoelectronic unit against external mechanical or thermal stresses.

The recess for the optoelectronic unit can be configured so as to reduce troublesome stray light effects. For this purpose, the radiation-emitting unit and the radiation-receiving detector unit can be largely shielded from the environment by walls of the housing body. Merely a tunnel-like passage, particularly an angled one, can be provided between the radiation-emitting unit and the radiation-receiving detector unit.

The optoelectronic unit is preferably comprised of more than one component. In particular, the radiation-emitting unit can be formed by at least one radiation-emitting chip, the radiation-receiving detector unit by at least one radiation-receiving chip and the circuit unit by a circuit chip provided with an integrated semiconductor circuit. The radiation-emitting chip and the radiation-receiving chip are interconnected with the circuit chip. The circuit chip can be implemented as an IC (Integrated Circuit) chip. To prevent the tilt sensor from entering a labile or undefined state, which can occur, for example, due to vibrations of the housing body or transient oscillation processes, a Schmitt trigger unit is provided in the circuit chip. Preferably two switching thresholds are then defined for the photocurrent supplied to the circuit chip by the radiation-receiving chip. The circuit chip serves to analyze the photocurrent in this case. A power feed to the radiation-emitting unit can further take place via the circuit chip. Other such functions can also be assigned to the circuit chip.

The radiation-emitting chip can be a light-emitting diode (LED), for example one that emits radiation in the infrared region. It is also conceivable for the radiation-emitting chip to be a laser diode. The radiation-receiving chip can be a photodiode or a phototransistor that is sensitive to the radiation emitted by the radiation-emitting chip. The radiation-receiving chip is so arranged that it is able to receive enough of the radiation emitted by the radiation-emitting chip to be able to generate a signal. The emitted radiation preferably arrives at the radiation-receiving chip by a direct route. The radiation-emitting chip can, for example, emit radiation in all spatial directions.

It is also conceivable for the emitted radiation to arrive at the radiation-receiving chip by an indirect route, in which case the radiation-emitting chip and the radiation-receiving chip are arranged next to each other on one side of the recess for the body. The radiation emitted by the radiation-emitting chip is reflected toward the radiation-receiving chip either by the body or by a reflecting element disposed on the opposite side of the recess.

The power consumption of the tilt sensor can advantageously be kept low by powering the radiation-emitting chip discretely and further by reading out and analyzing a tilt sensor signal at time intervals that are relatively large but are still adequate for a user of the device, for instance intervals of several hundred milliseconds. This further results in advantageous vibration damping. The power consumption can be limited to an average value of about 50 µA or less in this way.

A metal surface is preferably applied to the circuit board in the region of the recess for the body. The metal surface is particularly provided for connection to a ground potential. This has the advantage of preventing electrostatic discharges and thus permitting substantially unhindered movement of the body, as a result of the lower charge-induced attractive forces. A body that is not insulated and is at least slightly electrically conductive has proven advantageous for the same reason. Another suitable choice is material that is a comparatively good reflector or absorber, thereby rendering the body substantially radiopaque to the radiation emitted by the radiation-emitting chip. For example, the body can contain steel, silicon or a ceramic material. A suitable ceramic material is, for example, tungsten carbide, which is a particularly hard material of high density. The diameter of the body may become smaller as the tilt sensor undergoes miniaturization. This reduces the weight of the body, thus compromising its movement. A heavier material such as tungsten carbide advantageously can offset such a weight reduction.

The body is preferably only slightly or not at all magnetically interactive. The body can contain a slightly ferromagnetic steel, for example. The advantage of such a body lies in the ability to check the viability of the tilt sensor by means of strong magnets during production and subsequent processing. The ferromagnetic fraction should, however, be so small that no substantial effect is exerted on the body by the Earth's magnetic field.

According to a preferred variant, the tilt sensor delivers a digital output signal. This is especially advantageous with regard to the use of the tilt sensor in a digital device, for example a digital camera, for instance in distinguishing between a vertical format orientation and a transverse format orientation.

According to a further preferred variant, the predefined path runs on the circuit board. For example, the circuit board can be configured as planar, the body being guided solely by the recess in the housing body. The predefined path can further run on the inner surface of the housing body. Whether the path runs on the circuit board or on said inner surface typically depends on how the tilt sensor is mounted or the direction in which the tilt axis extends. If the predefined path runs on the circuit board, the tilt axis extends in a plane parallel to the circuit board. On the other hand, the tilt axis extends perpendicularly to the circuit board if the predefined path runs on the inner surface.

The predefined path can be straight, for example. In the second position, at which a second end of the path is located, the radiation-emitting chip is preferably disposed on a first side of the recess and the radiation-receiving chip is preferably disposed opposite it, on a second side of the recess. After a rotation of the tilt sensor in the field of gravity, the body is in the second position, between the radiation-emitting chip and radiation-receiving chip. Before such rotation the chip is in the first position, at which a first end of the path is located.

The predefined path can alternatively be curved. In the case of a curved path, the radiation-emitting chip is preferably disposed on the first side of the recess, midway between the first position and the second position, while a plurality of radiation-receiving chips are disposed next to one another on the second side of the recess. The body can be in the first position in the initial state, and on a rotation of the tilt sensor can move along the curved path to the second position, the final state. During such movement, a first number of radiation-receiving chips are shaded by the body, while a second number of radiation-receiving chips are irradiated. The instantaneous position of the body can be determined by considering all the individual instantaneous signals together.

The body is usefully an omnidirectionally rolling or bidirectionally rolling body or a sliding body. The body is in particular a ball, a cylinder or a disk. It is also conceivable to provide a plurality of balls instead of one ball, to reduce stray light effects.

The tilt sensor, which is preferably configured according to one of the above-cited implementations, can be installed in a device, for example in a mobile device such as a mobile phone, a camera or a pocket PC. In such a case, the tilt sensor is preferably installed in a way that makes it possible to distinguish between a vertical orientation of the longitudinal axis of the device and a horizontal orientation of the longitudinal axis of the device.

In a preferred manner, the tilt sensor is installed in the device in such a way that the path has an angular offset $\gamma>0°$ with respect to a supporting edge of the device. Assuming a vertical orientation of the longitudinal axis of the tilt sensor and a straight course for the path, the path particularly preferably has an angular offset $\gamma=45°$ with respect to the supporting edge. Another angular offset may also be contemplated. With such an angular offset $\gamma$, when the tilt sensor is tilted, the body is not set in motion until the sensor is tilted by a tilt angle $\alpha \leqq \gamma$. This advantageously increases the stability of the tilt sensor against shock.

In the case of a curved path, a straight-line connection between the end points of the path can have an angular offset $\gamma>0°$.

According to a preferred improvement of the tilt sensor, the latter includes a first body movable along a first predefined path and a second body movable along a second predefined path, said first and second paths running in a common plane. Advantageously, more exact determination of the tilt angle is possible with such a tilt sensor comprising two bodies than with a tilt sensor having one body. This is because, instead of two different tilt positions (vertical format orientation and transverse format orientation), four different tilt positions can be determined with the two bodies.

The first and second paths preferably run linearly and form an angle $\mu>0°$. Particularly preferably, said angle $\mu=90°$.

It is sufficient in this case for there to be one radiation-emitting unit or one radiation-emitting chip, which illuminates both bodies. The radiation-emitting unit or radiation-emitting chip can be disposed at an intersection point of the first and second paths. A radiation-receiving unit or a radiation-receiving chip is preferably then disposed on an opposite side of the first and second paths from the radiation-emitting unit or the radiation-emitting chip, as the case may be.

The manner of operation and the architecture of the tilt sensor equipped with two bodies are otherwise the same as in the case of the tilt sensor with one body.

A tilt sensor assembly can comprise a first and a second tilt sensor according to one of the above-cited implementations.

According to a preferred embodiment, the first tilt sensor and the second tilt sensor are disposed in a common plane. More exact determination of the tilt angle is advantageously possible in this way. This is because, instead of two different tilt positions (vertical format orientation and transverse format orientation), four different tilt positions can be determined with two tilt sensors, any two consecutive tilt positions preferably having a tilt angle difference of 90°.

According to an alternative embodiment, the first tilt sensor is disposed in a first plane and the second tilt sensor in a second plane running transversely to the first plane. This has the advantage of making it possible to determine not only a tilt of the tilt sensor, but also an inclination thereof. The tilt sensor is inclined by being rotated in the field of gravity about an axis of inclination, said axis of inclination running perpendicular to the tilt axis. Like the tilt axis, the axis of inclination extends in a plane parallel to the circuit board if the predefined path runs on the circuit board. On the other hand, the axis of inclination extends perpendicularly to the circuit board if the predefined path runs on the inner surface.

The tilt sensors are preferably arranged relative to one another in such a way that their predefined paths run transversely to one another. When the entire assembly is rotated about the tilt axis, four different tilt angles can be differentiated by means of the tilt sensor. Better attitude determination is thereby possible with the assembly than with a single tilt sensor.

Analogously to the tilt sensor, the tilt sensor assembly can be used for a mobile device, for example a mobile phone, a camera or a pocket PC. Furthermore, at least one of the two tilt sensors can be installed in the device in such a way that the path has an angular offset $\gamma > 0°$ with respect to a supporting edge of the device. This angle can be 45°. Correspondingly, the second tilt sensor has an angular offset $\gamma = 135°$.

According to a preferred implementation, the housing body is octagonal in horizontal section.

The finished tilt sensor preferably remains destruction-free even at soldering temperatures of more than 250° C. This can be achieved in particular by having the circuit board contain a material with a softening temperature $T_g > 140°$ C.

The inventive tilt sensor is not limited to the above-described embodiments. Further implementations are conceivable in which the underlying principle of operation of the tilt sensor is realized in another way.

In one possible variant of the tilt sensor, the body is a swinging body that is attached to the housing body by a suspension. The swinging body preferably does not undergo an excursion when the tilt sensor tilts. In the initial state, an axis on which the radiation-emitting and the radiation-receiving chips are disposed can extend at an angle of less than 90° to the axis of the swinging body. The beam path between the two chips is then closed. After a tilting of the tilt sensor and as a result of a tilting of the axis on which the radiation-emitting and the radiation-receiving chips are disposed, the two axes can form an angle of 90° in the final state. The beam path is then interrupted.

In an alternative variant of the tilt sensor, a column of fluid is disposed between the radiation-emitting chip and the radiation-receiving chip. The fluid can be admixed with radiation-absorbing particles, whose distribution in the fluid varies with the tilt angle. The radiation thus is absorbed to a greater or lesser degree, depending on the tilt angle. The same effect can be achieved with a column of fluid containing two non-miscible fluids of different transparency to radiation, or, alternatively, an absorbing fluid and a gas bubble.

The core idea of the implementations described so far has been the rotation of the tilt sensor about the tilt axis. For rotation about the tilt axis to be indicated in stable fashion, it is advantageous if rotation of the tilt sensor about the axis of inclination has a negligible influence on rotation about the tilt axis. This can be achieved, for example, if the surface on which the body moves is provided with obstacles. These keep the body from moving about unrestrictedly. The tilt sensor thus is relatively insensitive to shock and to rotation about the axis of inclination. This further means that the tilt angle at which the body begins to move is substantially independent of the angle of inclination.

The obstacles can be provided particularly in the form of trench-like or trough-like structurations that extend transversely to the direction of movement of the body.

Other preferred features, advantageous implementations and improvements, and advantages of a tilt sensor will emerge from the exemplary embodiments described in more detail below in conjunction with FIGS. 1 to 12.

DESCRIPTION OF THE DRAWINGS

Therein:

FIG. 1 is a schematic cross-sectional view of a first exemplary embodiment of a tilt sensor.

FIG. 2 is a schematic plan view of the first exemplary embodiment of a tilt sensor.

FIG. 3 is a schematic plan view of a second exemplary embodiment of a tilt sensor.

DETAILED DESCRIPTION OF THE DRAWINGS

Figure 4:
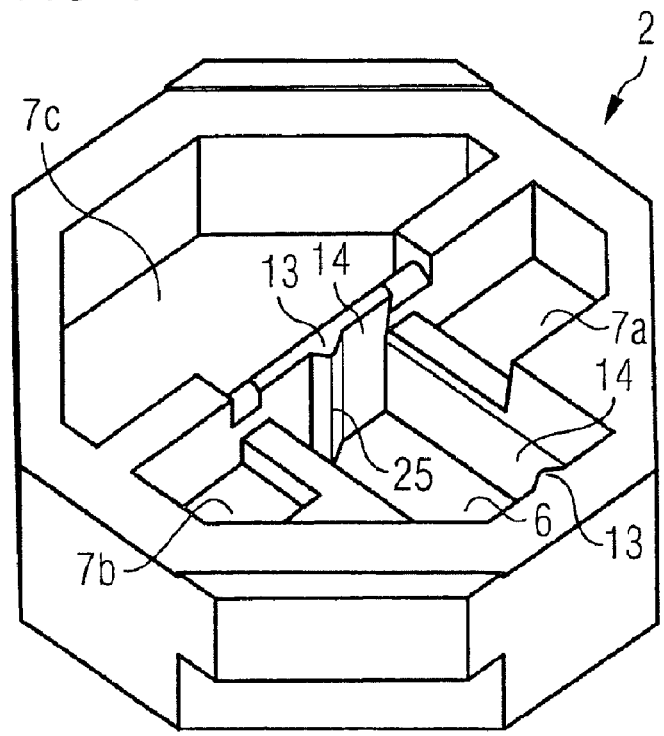
FIG. 4 is a perspective view of an exemplary embodiment of a housing body.

FIG. 1 depicts a tilt sensor 1 in a cross-sectional view A-A. Said tilt sensor 1 comprises a housing body 2, a body 3 and a circuit board 4. The housing body 2 is adjacent the planar circuit board 4, which simultaneously serves as bottom panel of the tilt sensor 1.

The circuit board 4 projects slightly beyond the side edges of the housing body 2. As shown in FIG. 2, vias 8a to 8d are provided at these locations.

Body 3 is disposed in a recess 6 provided for it in housing body 2. Recess 6 preferably has a channel-like shape. A cross section of recess 6 differs only slightly from a cross section of body 3, the size of recess 6 being calculated to allow the body 3 to move unhindered. The body 3 depicted in FIG. 1 is configured as a ball. This can have a diameter of, say, 0.8 mm. The diameter of the recess 6 can assume values in the range of, say, 1 mm.

On a rotation of the tilt sensor 1 about the tilt axis K, preferably by a tilt angle $\alpha = 90°$, body 3 moves from a first position I (as illustrated in FIG. 2) to a second position II (as illustrated in FIG. 2). The tilt axis K runs perpendicular to an axis G that extends parallel to the force of gravity. A guidance of body 3 is effected by means of inner surfaces 14. The body consequently moves along a straight path 24 (see FIG. 2) that runs on the circuit board 4. An outer surface of circuit board 4 on which the path 24 runs corresponds to the above-cited predefined surface. In this case, a tilt axis K extends in a plane parallel to the circuit board 4 and perpendicular to path 24.

A radiation-emitting chip 5a and a radiation-receiving chip 5b are so arranged that body 3 in second position II is between the two chips 5a and 5b (see FIG. 2). During operation, radiation-emitting chip 5a emits radiation in the direction of radiation-receiving chip 5b, the emitted radiation arriving at radiation-receiving chip 5b by a direct route. A beam path 10 is interrupted when body 3 is between the two chips 5a and 5b. Conversely, beam path 10 is closed when body 3 is not between the two chips 5a and 5b.

The housing body 2 comprises, in addition to recess 6, a recess 7a in which radiation-emitting chip 5a is disposed, and also a recess 7b in which radiation-receiving chip 5b is disposed.

FIG. 2 is a plan view of the tilt sensor 1 illustrated in FIG. 1. Said tilt sensor 1 includes an optoelectronic unit composed of radiation-emitting chip 5a, radiation-receiving chip 5b and a circuit chip 5c. Radiation-emitting chip 5a and radiation-receiving chip 5b are interconnected with circuit chip 5c by means of an electrical connection 11. The beam path 10 and a detector signal can be generated by means of this interconnection.

In this exemplary embodiment, beam path 10 is closed when body 3 is at position I. Conversely, beam path 10 is interrupted when body 3 is at position II.

Preferably, radiation-emitting chip 5a is an infrared radiation emitting LED, radiation-receiving chip 5b is a phototransistor and analyzing chip 5c is an ASIC.

Vias 8a to 8d, which are preferably in the shape of a quarter-circle or quarter-ring, are connected to back-side solder contacts. The tilt sensor 1 can easily be electrically connected in this way when mounted on a circuit board. Via 8a can be connected to a ground potential, for example, while via 8c is intended for a digital output signal.

The tilt sensor 1 depicted in FIG. 3 includes a metal surface 9. Metal surface 9 is connected, inter alia, to via 8b by means of a conductor path 12, and can thus be connected to a ground potential. This has the advantage that electrostatic discharges can be prevented. Body 3 can likewise contain a material that is at least slightly electrically conductive. As shown in FIG. 3, path 24 can run on metal surface 9.

Figure 5:
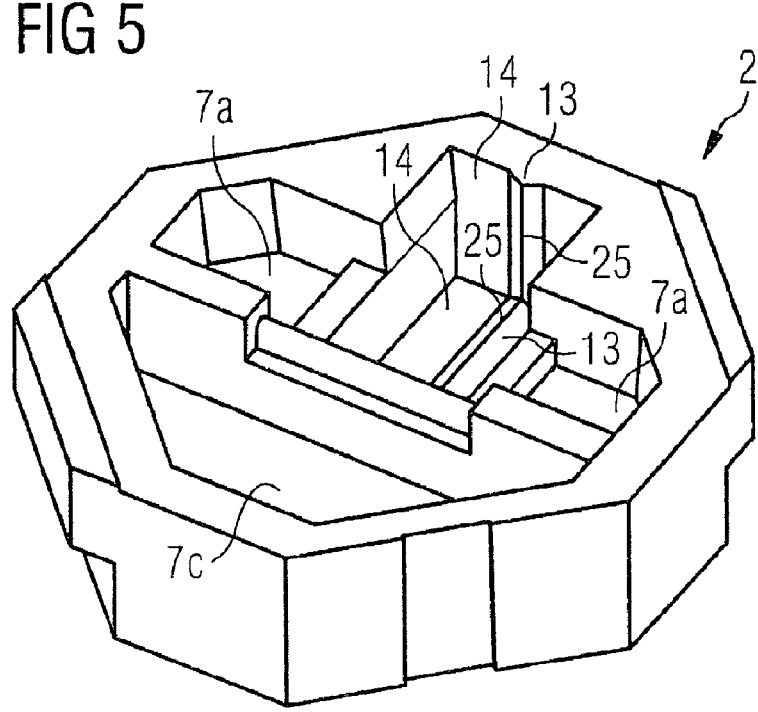
FIG. 5 is a further perspective view of the exemplary embodiment of a housing body.

Illustrated in FIGS. 4 and 5 is a housing body 2 that is especially suitable for a tilt sensor. Housing body 2 has recesses 7a, 7b and 7c, into which project, in the finished tilt sensor, radiation-emitting chip 5a (not shown), radiation-receiving chip 5b (not shown) and circuit chip 5c (not shown), which form the optoelectronic unit. Also in the finished tilt sensor, body 3 (not shown) is disposed in channel-like recess 6, said body 3 moving about the tilt axis in the longitudinal direction of the recess 6 on rotation of the tilt sensor.

The housing body 2 can have a polygonal shape, particular an octagonal shape. This shape advantageously helps to give the finished tilt sensor a compact construction.

To reduce the static friction that can develop between the body 3 (not shown) and the inner surface 14 of the housing body 2, said inner surface 14 comprises at least one projection 13. Said projection 13 preferably extends in a roof shape on inner surface 14.

The roof-shaped configuration of projection 13 advantageously reduces a contact surface between the body 3 (not shown) and the inner surface 14, since the body 3 rests on an edge 25 of projection 13.

As mentioned above in the general part of the description, the housing body 2 preferably contains a synthetic material that reduces stray light effects, which are detrimental to the optoelectronic unit. Particularly preferably, the housing body 2 also contains an electrical material, to prevent electrostatic discharges.

Figure 6:
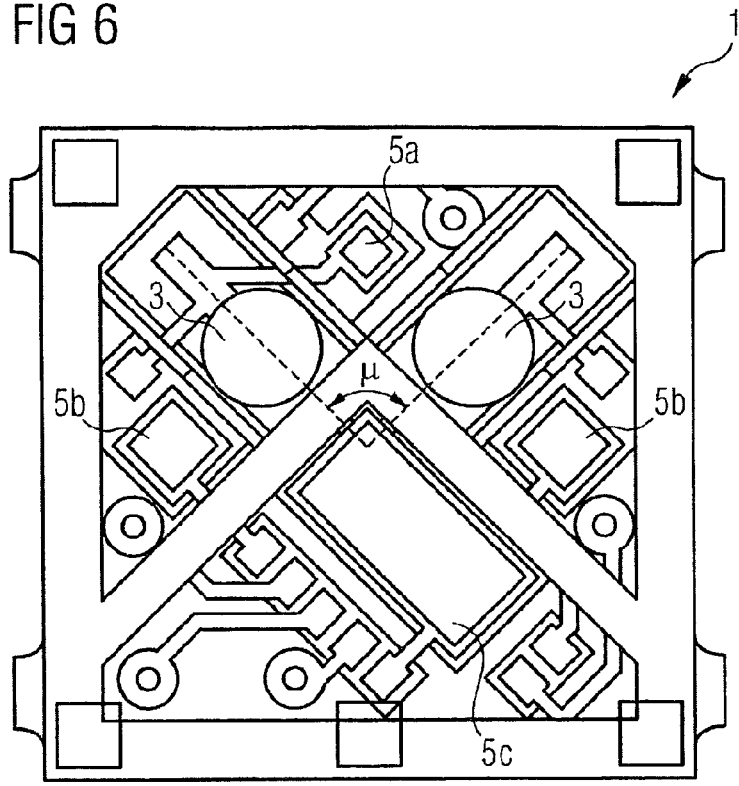
FIG. 6 is a schematic plan view of a third exemplary embodiment of a tilt sensor.

The tilt sensor illustrated in FIG. 6 has two bodies 3, each movable along its own path 24. The two paths here run linearly and form an angle $\mu=90°$. Advantageously, more exact determination of the tilt angle is possible with such a tilt sensor than with a tilt sensor as depicted in FIGS. 1 to 3. This is because, instead of two different tilt positions (vertical format orientation and transverse format orientation), four different tilt positions can be determined by means of the two bodies.

Two bodies can be illuminated by means of the radiation-emitting chip 5a, although for purposes of radiation detection, one radiation-emitting chip 5b is provided for each body 3.

Figure 7:
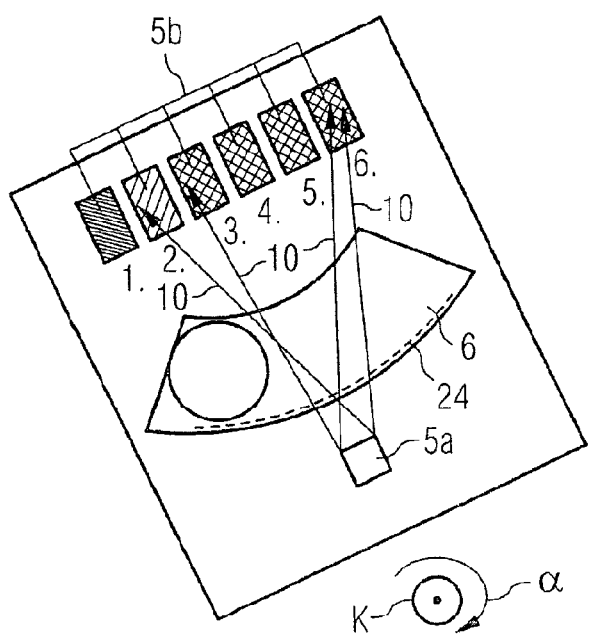
FIG. 7 is a schematic representation of a fourth exemplary embodiment of a tilt sensor.
Figure 8:
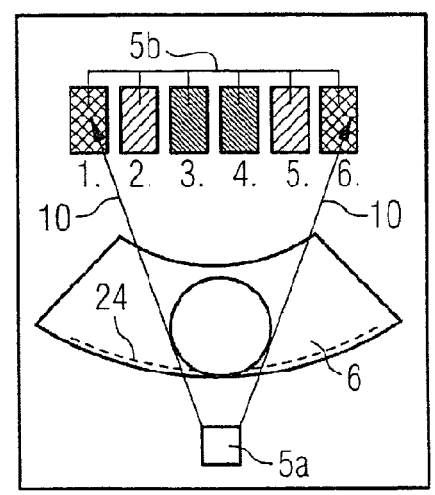
FIG. 8 is a further schematic representation of the fourth exemplary embodiment of a tilt sensor.

A plan view of a detail of a tilt sensor is illustrated schematically in each of FIGS. 7 and 8.

In this case, the housing body has one recess 6, which is configured in the shape of a ring segment. Said ring segment is not necessarily a circular ring segment. The radiation-emitting chip 5a is disposed on one side of the recess 6. A plurality of radiation-receiving chips 5b are disposed on an opposite side of the recess 6.

Prior to a rotation of the tilt sensor about tilt axis K, which runs perpendicular to the plane of the drawing, the 1st chip 5b is substantially shaded by body 3. The beam path thus is interrupted. All the other beam paths 10, however, are closed, the detector signals from the 3rd to the 6th chip 5b being the strongest.

As a result of a rotation of the tilt sensor by a tilt angle $\alpha$, body 3 moves along path 24, which, due to the shape of the recess 6, is curved.

As illustrated in FIG. 8, the body 3 can shade the 3rd and 4th chips 5b for about half of its course of travel. The beam path 10 of the 1st and 6th chips 5b, on the other hand, is closed.

The arrangement illustrated in FIGS. 7 and 8 advantageously makes it possible to determine the instantaneous position of the body 3. This, in turn, makes it possible to determine the instantaneous tilt angle $\alpha$.

Figure 9:
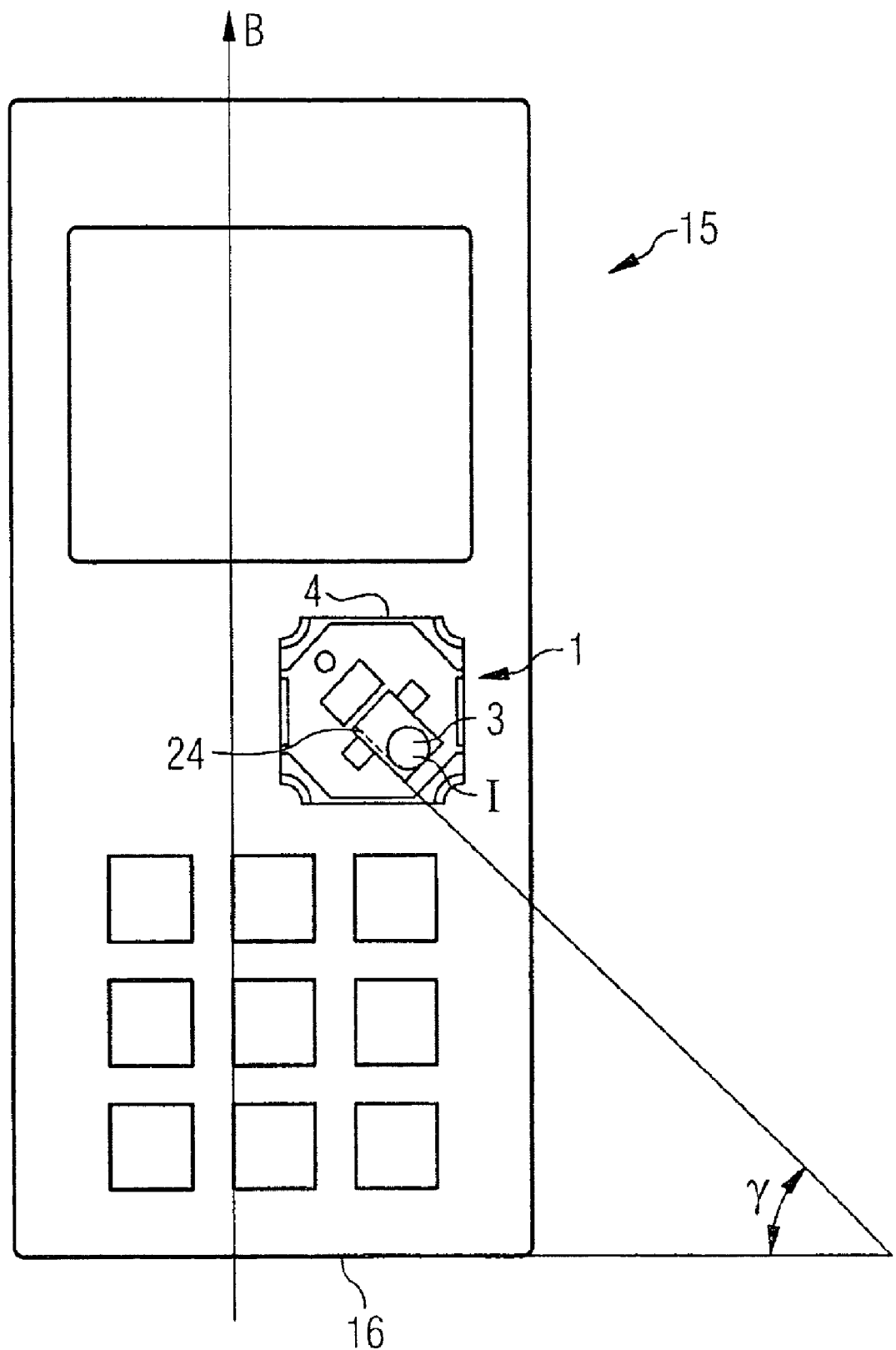
FIG. 9 is a schematic representation of a first device equipped with a tilt sensor.

FIG. 9 illustrates a device 15 equipped with a tilt sensor 1. Device 15 represents a mobile phone, which is set on edge, such that a longitudinal axis B of the device 15 is oriented vertically. This state, in which, moreover, body 3 is in position I, can be defined as the initial state.

The tilt sensor 1 is preferably installed in device 15 in such a way that the path 24 along which body 3 moves has an angular offset $\gamma=45°$ with respect to a side edge 16 of the device 15. Side edge 16 simultaneously forms a supporting edge of device 15.

Figure 10:
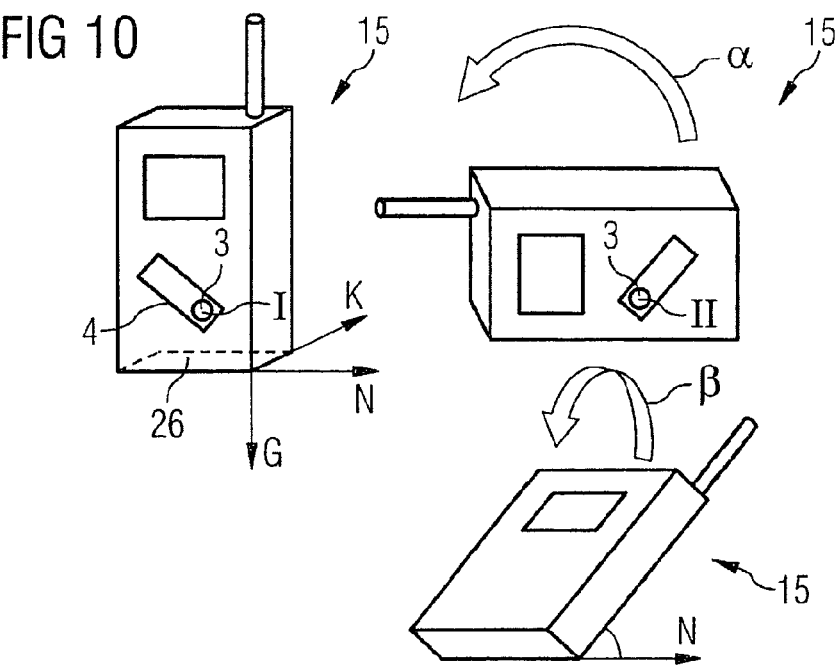
FIG. 10 is a schematic representation of the various orientations of the device.

FIG. 10 shows a rotation of device 15 about the tilt axis K. On a counterclockwise rotation by a tilt angle $\alpha=90°$, body 3 moves from position I to position II. The change in position can be determined by the fact that beam path 10 (not shown) is closed at position I, whereas it is interrupted at position II. In this exemplary embodiment, tilt axis K extends perpendicularly to the circuit board 4. Furthermore, the tilt sensor 1 is mounted in the device 15 in such a way that the circuit board 4 is disposed perpendicularly to a supporting surface 26. Alternatively, the circuit board 4 can be disposed parallel to supporting surface 26. In the case of a perpendicular arrangement, the path runs on the inner surface 14 (not shown). In the case of a parallel arrangement, the path (not shown) runs on the circuit board 4.

A rotation of the device 15 about the axis of inclination N is also depicted in FIG. 10. This rotation can be expressed by the angle of inclination $\beta$. Axis of inclination N runs perpendicular to tilt axis K.

As indicated, tilt axis K and axis of inclination N run perpendicular to an axis G that extends parallel to the force of gravity.

Figure 11:
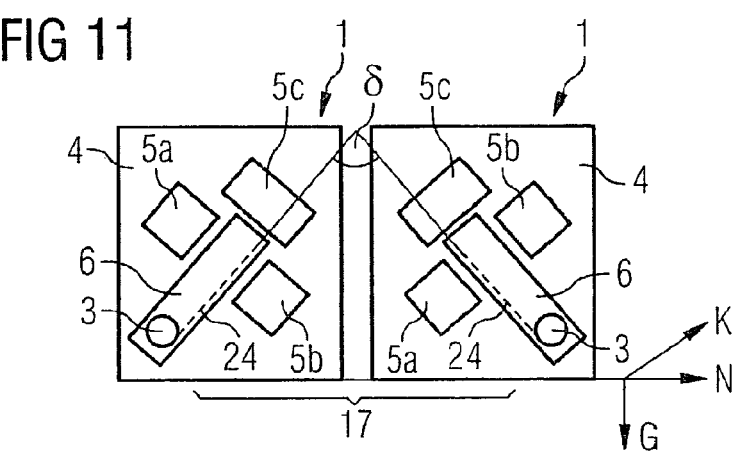
FIG. 11 is a schematic representation of a first exemplary embodiment of a tilt sensor assembly.

The tilt sensor assembly 17 illustrated in FIG. 11 comprises two tilt sensors 1. The circuit boards 4 in question extend in a common plane. However, the paths 24 of the tilt sensors 1 run transversely to each other, forming an angle $\sigma=0°$. Such an arrangement makes it possible to distinguish unequivocally between four different tilt angles $\alpha$ upon a rotation about the tilt axis K. If $\sigma=90°$, the tilt angles that can be determined unequivocally differ from each other by 90°. Hence, such a tilt sensor assembly 17 makes it possible to distinguish between four different orientations, for example of the longitudinal axis of a mobile device.

Figure 12:
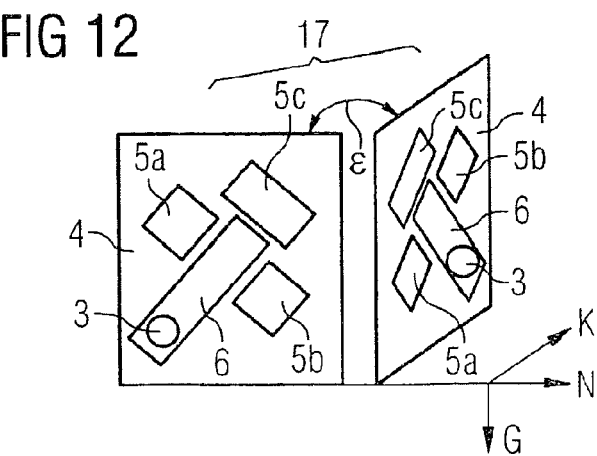
FIG. 12 is a schematic representation of a second exemplary embodiment of a tilt sensor assembly.

The tilt sensor assembly 17 illustrated in FIG. 12 is also operative to determine a change in the angle of inclination $\beta$. For this purpose, the circuit boards 4 of the two tilt sensors 1 are arranged transversely to each other, the angle $\epsilon$ being greater than 0°. As in tilt sensor assembly 17 of FIG. 10, the paths also run transversely to each other.

The invention is not limited by the description made with reference to the exemplary embodiments. Rather, the invention encompasses any novel feature and any combination of features, including in particular any combination of features recited in the claims, even if that feature or combination itself is not explicitly mentioned in the claims or exemplary embodiments.

The invention claimed is:

1. A tilt sensor comprising:
   at least one body movable along a predefined path; and
   an optoelectronic unit for determining the position of said body, said tilt sensor being surface-mountable.
2. The tilt sensor as in claim 1, wherein said tilt sensor is able to rotate about a tilt axis (K) in such a way that said body moves from a first position (I) to a second position (II).
3. The tilt sensor as in claim 2, wherein a beam path generated by means of said optoelectronic unit is closed when said body is in said first position (I).
4. The tilt sensor as in claim 2, wherein a beam path generated by means of said optoelectronic unit is interrupted when said body is in said second position (II).
5. The tilt sensor as in claim 2, wherein after a rotation of said tilt sensor by a tilt angle α=90°, said body is in said second position (II).
6. The tilt sensor as in claim 1, wherein the force of gravity causes a movement of said body along said path.
7. The tilt sensor as in claim 1, comprising a housing body.
8. The tilt sensor as in claim 7, wherein said body is disposed in a recess in said housing body.
9. The tilt sensor as in claim 8, wherein said recess is configured as channel-like.
10. The tilt sensor as in claim 8, wherein said housing body comprises at least one projection or indentation inside said recess.
11. The tilt sensor as in claim 10, wherein said projection or said indentation is disposed on an inner surface bounding said recess.
12. The tilt sensor as in claim 11, wherein said projection or said indentation is configured such that a contact surface between said body and said inner surface is reduced.
13. The tilt sensor as in claim 11, wherein said projection extends in a roof shape on said inner surface.
14. The tilt sensor as in claim 11, wherein said indentation is configured as gutter-shaped.
15. The tilt sensor as in claim 7, wherein said housing body contains an electrically conductive material.
16. The tilt sensor as in claim 15, wherein said housing body contains carbon fibers or carbon black particles.
17. The tilt sensor as in claim 11, comprising a circuit board that is connected to said housing body.
18. The tilt sensor as in claim 17, wherein said circuit board serves as bottom panel of said tilt sensor.
19. The tilt sensor as in claim 17, wherein said optoelectronic unit is disposed on said circuit board.
20. The tilt sensor as in claim 8, wherein said optoelectronic unit is disposed in an additional recess of said housing body.
21. The tilt sensor as in claim 1, wherein said optoelectronic unit includes at least one radiation-emitting chip, at least one radiation-receiving chip and preferably a circuit chip.
22. The tilt sensor as in claim 8, wherein a metal surface is applied to said circuit board in the region of said recess for said body.
23. The tilt sensor as in claim 22, wherein said metal surface provides connection to a ground potential.
24. The tilt sensor as in claim 1, which supplies a digital output signal.
25. The tilt sensor as in claim 18, wherein said path runs on said circuit board.
26. The tilt sensor as in 18, wherein said path runs on said inner surface.
27. The tilt sensor as in claim 1, wherein said path is curved.
28. The tilt sensor as in claim 1, wherein said body (3) is a ball, a cylinder or a disk.
29. The tilt sensor as in claim 1, which is installed for purposes of position determination in a mobile device.
30. The tilt sensor as in claim 29, wherein said tilt sensor is installed in said device in such a way that said path has an angular offset γ>0° with respect to a supporting edge of said device.
31. The tilt sensor as in claim 1, wherein said tilt sensor [includes] a first body movable along a first predefined path and a second body movable along a second predefined path, said first and second paths running in a common plane.
32. The tilt sensor as in claim 31, wherein said first and second paths run linearly and form an angle μ>0°.
33. The tilt sensor as in claim 31, wherein one radiation-emitting unit illuminates said first and said second body.
34. A tilt sensor assembly, comprising a first and a second tilt sensor as in claim 1.
35. The tilt sensor assembly as in claim 34, wherein said first tilt sensor and said second tilt sensor are disposed in a common plane.
36. The tilt sensor assembly as in claim 34, wherein said first tilt sensor is disposed in a first plane and said second tilt sensor in a second plane running transversely to said first plane.
37. The tilt sensor assembly as in claim 34, wherein said tilt sensors are arranged relative to each another in such a way that said paths run transversely to each other.
38. The tilt sensor assembly as in claim 34, which is installed for purposes of attitude determination in a mobile device.
39. The tilt sensor as in claim 29, wherein the mobile device is a mobile phone, a camera, or a pocket PC.
40. The tilt sensor as in claim 38, wherein the mobile device is a mobile phone, a camera, or a pocket PC.
41. A tilt sensor comprising:
    at least one body movable along a predefined path; and
    an optoelectronic unit for determining the position of said body,
    wherein the tilt sensor is configured to be electrically connected wirelessly to a circuit board or to another substrate.

* * * * *

UNITED STATES PATENT AND TRADEMARK OFFICE
CERTIFICATE OF CORRECTION

PATENT NO. : 7,975,394 B2  
APPLICATION NO. : 12/295794  
DATED : July 12, 2011  
INVENTOR(S) : Frank Mollmer et al.

Page 1 of 1

It is certified that error appears in the above-identified patent and that said Letters Patent is hereby corrected as shown below:

In column 12, line 14, delete "18," and insert -- claim 18, --.

In column 12, line 26, delete "[includes]" and insert -- includes --.

Signed and Sealed this

Twenty-fifth Day of October, 2011

David J. Kappos  
*Director of the United States Patent and Trademark Office*